United States Patent
Glynn et al.

(10) Patent No.: US 6,843,528 B2
(45) Date of Patent: Jan. 18, 2005

(54) LATCH LOCKOUT FOR A VEHICULAR TRIM COMPONENT

(75) Inventors: Jeanette G. Glynn, Orion, MI (US); James Chesney, Howell, MI (US); Adam Walker, Clio, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/288,016

(22) Filed: Nov. 5, 2002

(65) Prior Publication Data

US 2004/0084948 A1 May 6, 2004

(51) Int. Cl.$^7$ .............................. B60N 2/46; A47C 7/62; A47C 7/54
(52) U.S. Cl. ............................ 297/188.01; 297/188.14; 297/188.15; 297/188.19; 297/411.2; 297/411.3; 297/411.32
(58) Field of Search .......................... 297/411.2, 411.3, 297/411.32, 188.01, 188.14, 188.15, 188.19

(56) References Cited

U.S. PATENT DOCUMENTS

| | | | |
|---|---|---|---|
| 3,756,639 A | 9/1973 | Wilkinson | 292/179 |
| 4,094,392 A | 6/1978 | Gregg et al. | 190/41 |
| 4,579,384 A | 4/1986 | Sharod | 297/113 |
| 4,865,368 A | 9/1989 | McCall et al. | 292/175 |
| 4,890,883 A | 1/1990 | Boerema et al. | 297/188.19 X |
| 4,906,044 A | 3/1990 | Wilstermann | 297/188.15 |
| 5,116,099 A | 5/1992 | Kwasnik et al. | 297/188.15 |
| 5,425,568 A | 6/1995 | Sliney et al. | 297/378.11 |
| 5,803,537 A | 9/1998 | Langmeser et al. | 297/188.19 |
| 5,810,434 A | 9/1998 | Thompson et al. | 297/188.19 |
| 5,873,633 A | 2/1999 | Lang et al. | 297/411.32 |
| 6,007,155 A | 12/1999 | Hara et al. | 297/463.2 |
| 6,010,193 A | 1/2000 | Hara et al. | 297/411.35 |
| 6,224,296 B1 | 5/2001 | Fukumori | 405/282 |
| 6,419,314 B1 | 7/2002 | Scheerhorn | 297/188.19 |

FOREIGN PATENT DOCUMENTS

JP 0518358 2/1992 ............ B60N/2/46

*Primary Examiner*—Rodney B. White
(74) *Attorney, Agent, or Firm*—Honigman Miller Schwartz and Cohn LLP

(57) ABSTRACT

A vehicle trim component is disclosed. The vehicle trim component includes a latch lockout assembly that comprises a latch lockout, a pivot member, and a housing. The latch lockout and pivot member are pivotally secured to the housing and permits physical engagement of the latch lockout against a latch member affixed to the vehicle trim component due to gravitational force when the vehicle trim component is pivoted at a predetermined pivot angle. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

17 Claims, 6 Drawing Sheets

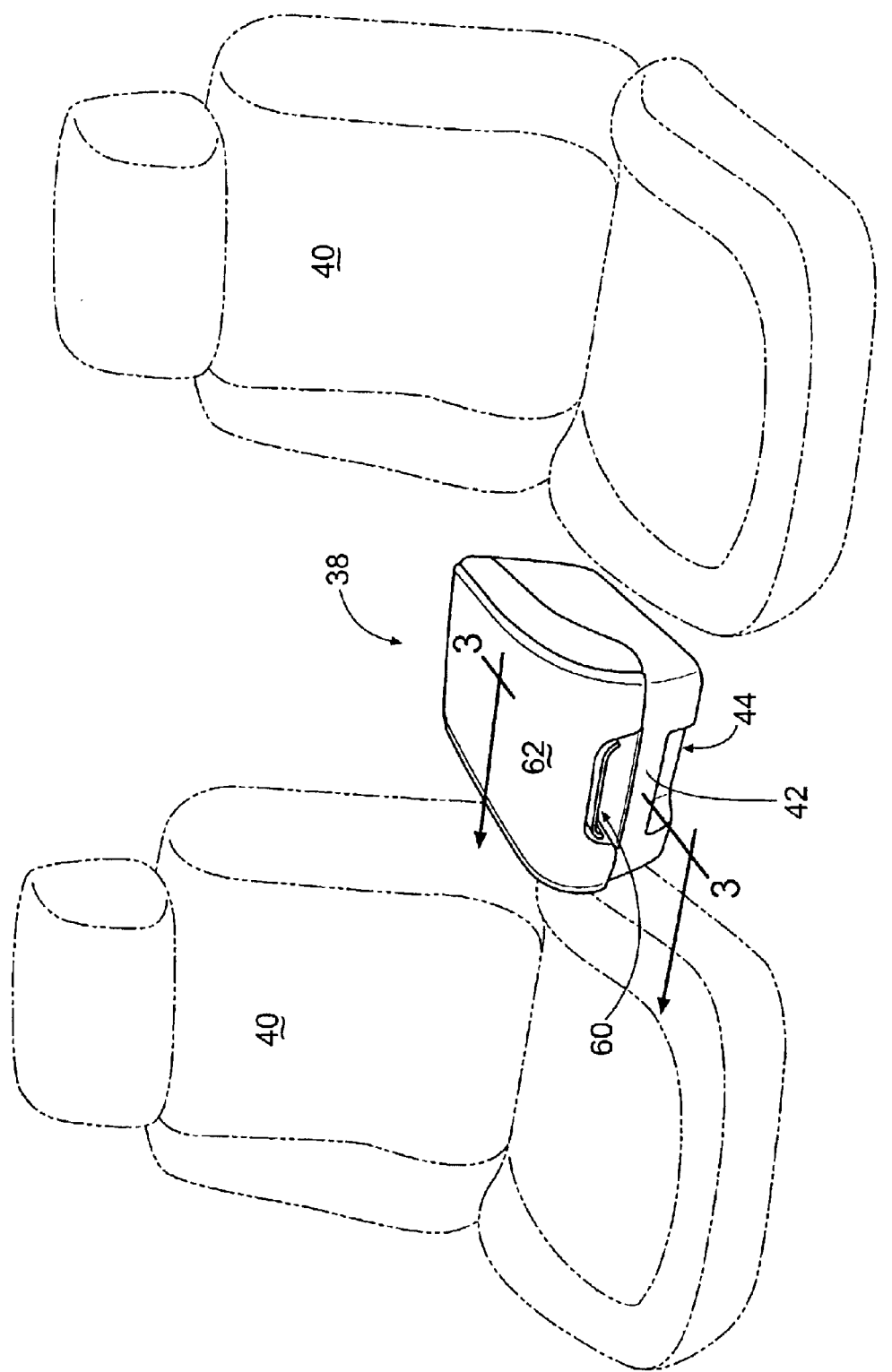

LATCH LOCKOUT FOR A VEHICULAR TRIM COMPONENT

TECHNICAL FIELD

The present invention relates to interior trim components of a vehicle, and in particular to a latch lockout for a vehicular trim component, for example, a rotating armrest storage bin.

BACKGROUND OF THE INVENTION

Typically, vehicular trim components, such as a rotating armrest assembly, may comprise a storage bin that rotates from a generally horizontal, in-use position to a generally vertical, stowed position. For example, the armrest assembly may be rotated from approximately 0° at the horizontal position to a position greater than or equal to approximately 90° at the vertical position. The storage bin typically comprises a decorative top cover that functions as a pivotal lid for the storage bin. When the armrest assembly is rotated to the generally vertical, stowed position, a latch assembly that retains the top cover to the storage bin may be undesirably triggered, resulting in the pivotal deployment of the top cover and the evacuation of items that are stored in the storage bin.

In order to overcome this problem, conventional gravity-actuated mechanisms have been proposed. Essentially, the gravity-actuated mechanisms "lockout" the latch assembly when the armrest assembly is positioned towards a vertical orientation as explained above. For example, two known approaches that have been previously employed include either a "free part," such as a locking ball or barrel, or a pivoting mechanism, such as a pendulum.

Although adequate for most situations, the conventional free part mechanisms inherently include undesirable noise and rattle problems when rocked in a free part housing. In addition, the conventional free part mechanisms may not engage and lockout the latch assembly until the armrest assembly is in a nearly vertical position at approximately 90°. Further, if the free part or the associated free part housing includes design imperfections on its respective surface, the free part may be hindered from properly engaging the latch assembly. Even further, if the free part does not properly sit in its optimally designed locked position, the latch assembly may not be engaged until the armrest assembly is pivoted past approximately 90° at the generally vertical, stowed position.

Although adequate for most situations, the conventional pivoting pendulum mechanism requires the addition of several parts, such as, at least a pushbutton actuator, a latch plate, a latch, a bias spring, a locking post, and a latch slide that includes the pendulum, resulting in increased design issues, production time, and cost.

Thus, a need exists for an improved latch lockout that reduces production time, cost, and parts, while also reducing noise and providing an early engagement of the latch assembly associated with the top cover as the armrest assembly is orientated from the generally horizontal, in-use position to the generally vertical, stowed position.

SUMMARY OF THE INVENTION

The inventors of the present invention have recognized these and other problems associated with conventional latch lockout structures for vehicular trim components. To this end, the inventors have developed a vehicle trim component comprising a latch lockout assembly including a latch lockout assembly including a latch lockout, a pivot member, and a housing, the latch lockout and pivot member being pivotally mounted to the housing to permit physical engagement of the latch lockout and a latch member due to a gravitational force, G, when the vehicle trim component is pivoted to a predetermined pivot angle.

In another aspect of the invention, a pivoting armrest and latch lockout assembly comprises a pivot member; a latch lockout including a locking finger defined by a first notch and a second notch that each extends to and terminates at a latch member engagement surface; a latch member affixed to a top cover of the armrest; and a housing affixed to an interior structure the armrest, wherein the latch lockout and pivot member are pivotally mounted to the housing to permit physical engagement of the latch lockout and the latch member engagement surface, and wherein the latch lockout freely rests at a distance away from the latch member when the armrest is positioned in a generally horizontal position, and wherein the latch member engagement surface physically engages the latch member when the armrest is pivoted at a predetermined pivot angle, and wherein a force, F, applied to the latch member is directly translated to the latch lockout, thereby preventing the latch member from unlatching and deploying the top cover of the armrest.

In yet another embodiment of the invention, a pivoting armrest and latch lockout assembly comprises a pivot member; a latch member affixed to a top cover of the armrest; a latch lockout including means for physically engaging the latch member; and a housing affixed to an interior structure the armrest, the latch lockout and pivot member being pivotally mounted to the housing, wherein the latch lockout freely rests at a distance away from an engagement surface of the latch member when the armrest is positioned in a generally horizontal position, and wherein the latch member physically engages the engagement surface of the latch member at a predetermined pivot angle when the armrest is pivoted to a predetermined pivot angle, and wherein a force, F, applied to the latch member is directly translated to the latch lockout, thereby preventing the latch member from unlatching when the armrest is pivoted to the predetermined pivot angle.

BRIEF DESCRIPTION OF THE DRAWINGS

The present invention will now be described, by way of example, with reference to the accompanying drawings, in which:

FIG. 2A is a perspective view of a vehicle interior illustrating a pair of seats and an armrest assembly in a generally horizontal, in-use position;

DESCRIPTION OF THE PREFERRED EMBODIMENTS

Figure 1:
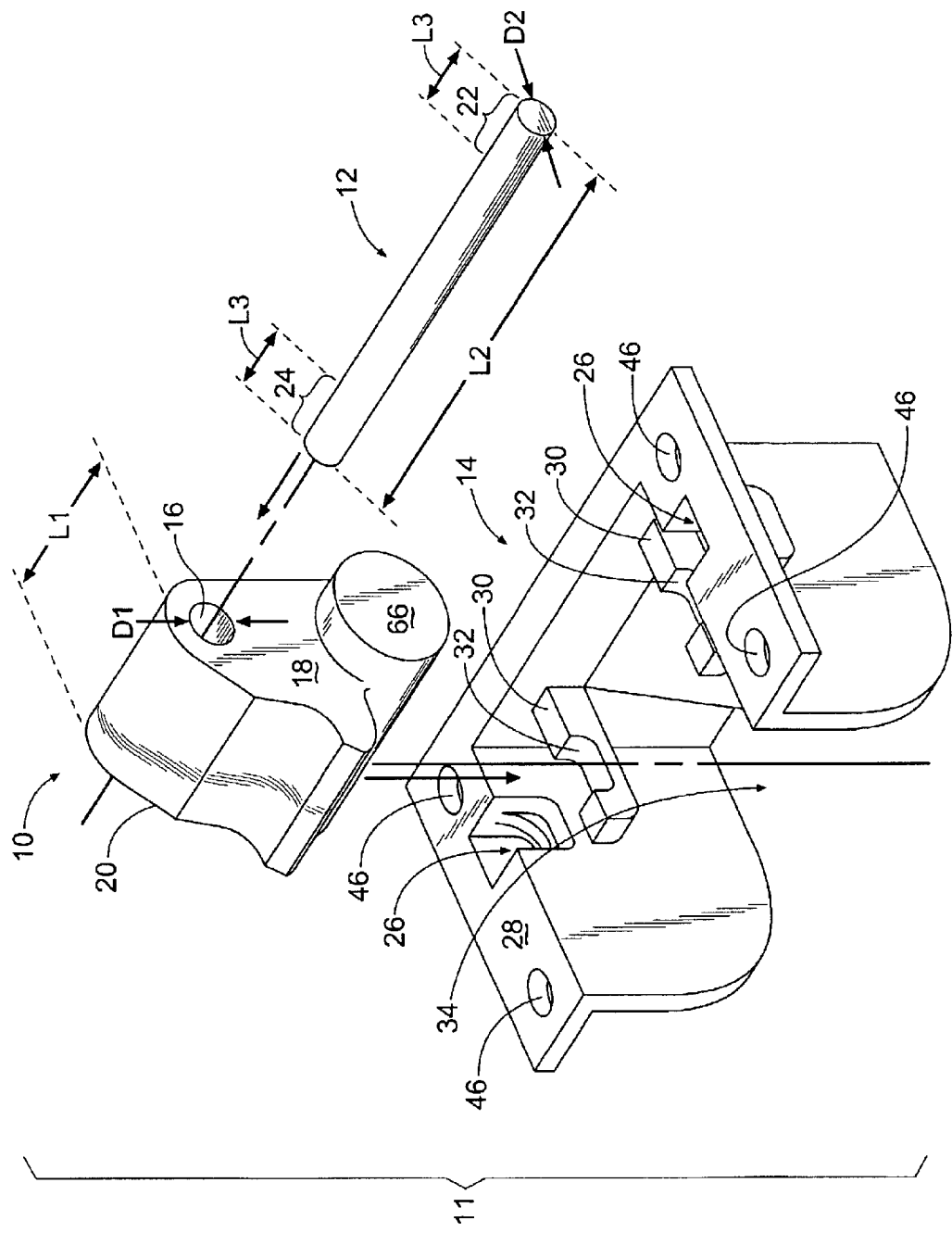
FIG. 1 is an exploded view of a latch lockout assembly and latch lockout according to an embodiment of the invention.

Referring to FIG. 1, a latch lockout assembly, shown generally at 11, includes a latch lockout, shown generally at 10, according to an embodiment of the invention. The latch lockout 10 may be formed using any desirable method, such as injection molding, or the like. The latch lockout 10 may be made of any desirable thermoplastic resin, such as, for example, Polypropylene (PP), Acrylnitril-Butadien-Styrol-Copolymere (ABS), Polycarbonate-Acrylnitril-Butadien-Styrol-Copolymere (PC/ABS), Thermoplastic Olefin (TPO), or polyvinyl chloride (PVC). The inventive feature and utility of the latch lockout 10 is described in more detail below.

The latch lockout assembly 11 generally comprises the latch lockout 10, a pivot member 12, and a housing 14. The latch lockout assembly 11 is assembled by inserting the pivot member 12 through a passage 16, having a diameter, D1, that is integrally formed and extends through a first side 18 to a second side 20 of the latch lockout 10. The latch lockout 10 is further defined by a length, L1, that extends from the first side 18 to the second side 20. The pivot member 12 is defined by a diameter, D2, and a length, L2.

In order to permit insertion of the pivot member 12 through the passage 16, the diameter, D2, of the pivot member 12 is sized such that it is slightly less than the diameter, D1, of the latch lockout 10. Similarly, in order to permit reception of the pivot member 12 about the housing 14, the length, L2, of the pivot 12 is sized such that it is slightly larger than the length, L1, of the latch lockout 10; thus, a first portion 22 and a second portion 24 of the pivot member 12 protrudes from the first end 18 and second end 20 of the latch lockout 10, respectively. The first portion 22 and second portion 24 each are defined by a length, L3, which has a total length equal to the length, L2, of the pivot 12 less the length, L1, of the latch lockout 10. As shown in FIG. 1, the first and second portions 22, 24 are approximately equal in length. However, the invention can be practiced with the first and second portions 22, 24 having different lengths. The pivot member 12 may comprise any desirable metal and may be coated with any desirable material that permits the latch lockout 10 to pivot about the housing 14. For example, one such material for permitting the latch lockout 10 to pivot about the housing 14 can be in the form of an abrasion-resistant thermoplastic resin that is sold under trade name SANTOPRENE®.

Once the pivot member 12 is inserted through the passage 16 of the latch lockout 10, the first portion 22 and second portion 24 are inserted into symmetrically formed cradles 26 that are integrally formed in an upper plane 28 of the housing 14. The housing 14 may also include arms 30 and detents 32. The arms 30 are spaced at a distance slightly greater than the length, L1, of the latch lockout 10 in order to permit reception of the latch lockout 10 and provide additional support for the pivot member 12, respectively. Upon fully inserting the first portion 22 and the second portion 24 into the cradles 26 and the detents 32 (if provided), the pivot member 12 enables pivotal movement of the latch lockout 10 within an open area or cavity 34 of the housing 14.

Figure 2B:
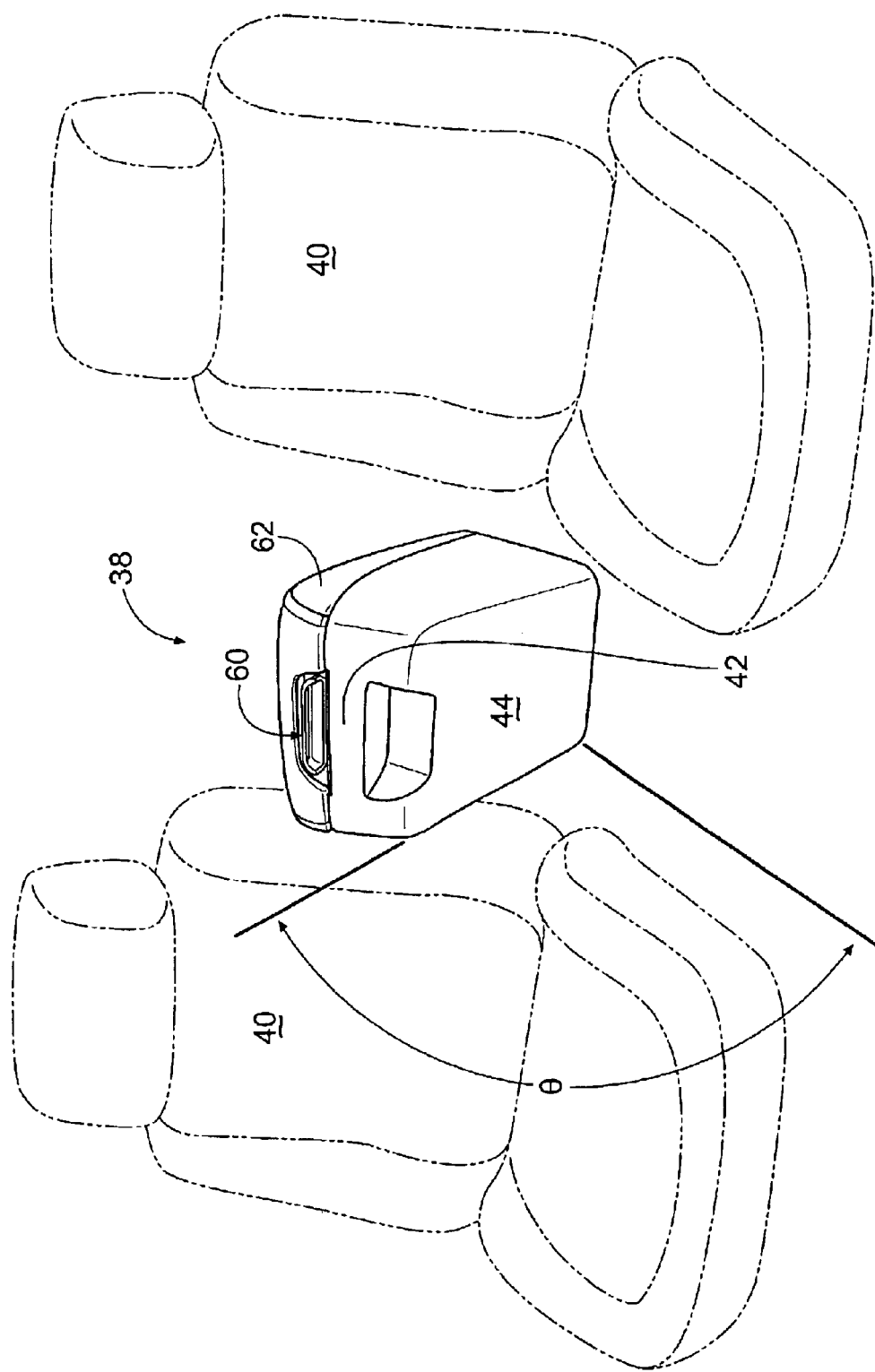
FIG. 2B is another perspective view of the vehicle interior illustrating a pair of seats and an armrest assembly in a generally vertical, stowed position.

One possible implementation of the latch lockout assembly 11 is illustrated in FIGS. 2A and 2B. After the latch lockout assembly 11 is fully assembled, the housing 14 is affixed to an interior structure 36 (FIGS. 3A and 3B) of a vehicular trim component, such as an armrest 38 that is shown positioned between two vehicle front seats 40. As illustrated, the interior structure 36 is located near a front portion 42 of an armrest base 44. The housing 14 may be screwed, heat-staked, glued, welded, or attached to the interior structure 36 with by desirable method. If the housing 14 is screwed or heat-staked to the interior structure 36, the housing 14 may also include passages 46 (FIG. 1) that permit the passage of a screw (not shown) or heatstake (not shown). Accordingly, once the latch lockout assembly 11 is affixed to the interior structure 36 of the armrest base 44, the latch lockout 10 may operate as described below.

Figure 3A:
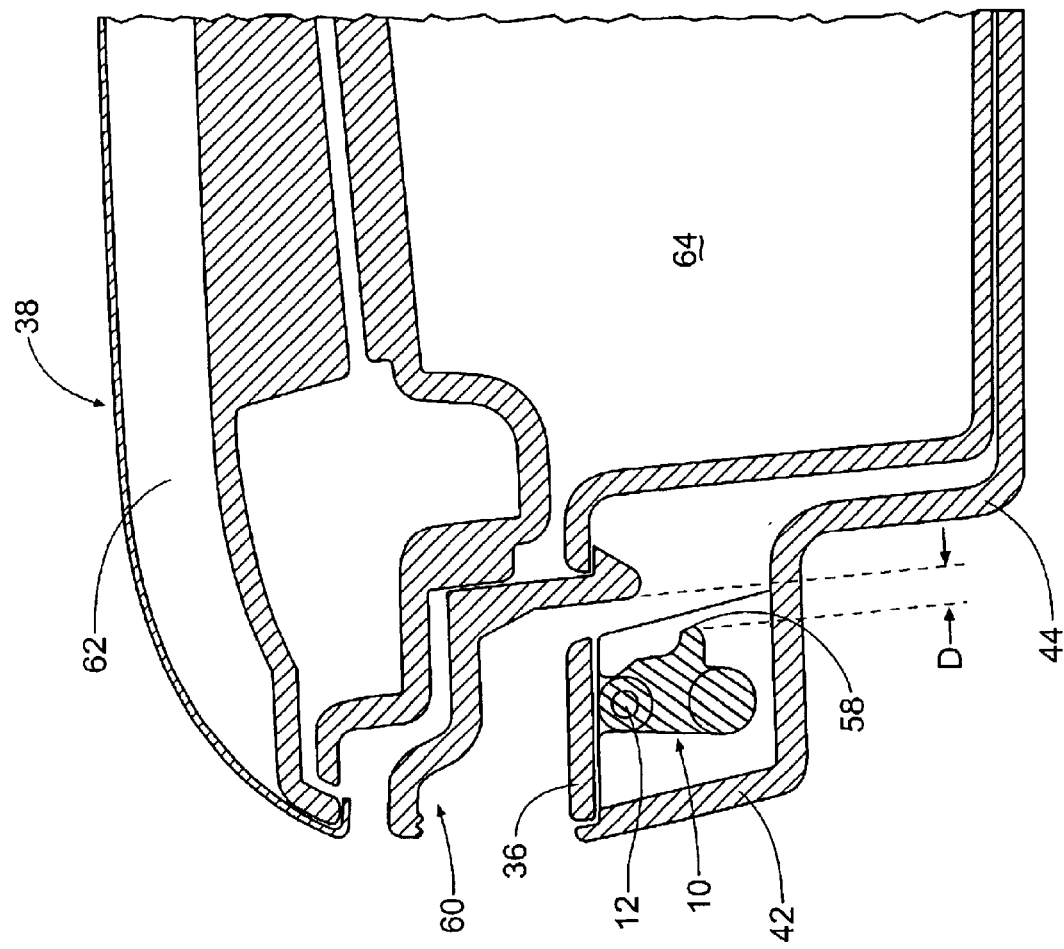
FIG. 3A is a partial cross-sectional view of the armrest assembly taken along line 3—3 of FIG. 2A.
Figure 3B:
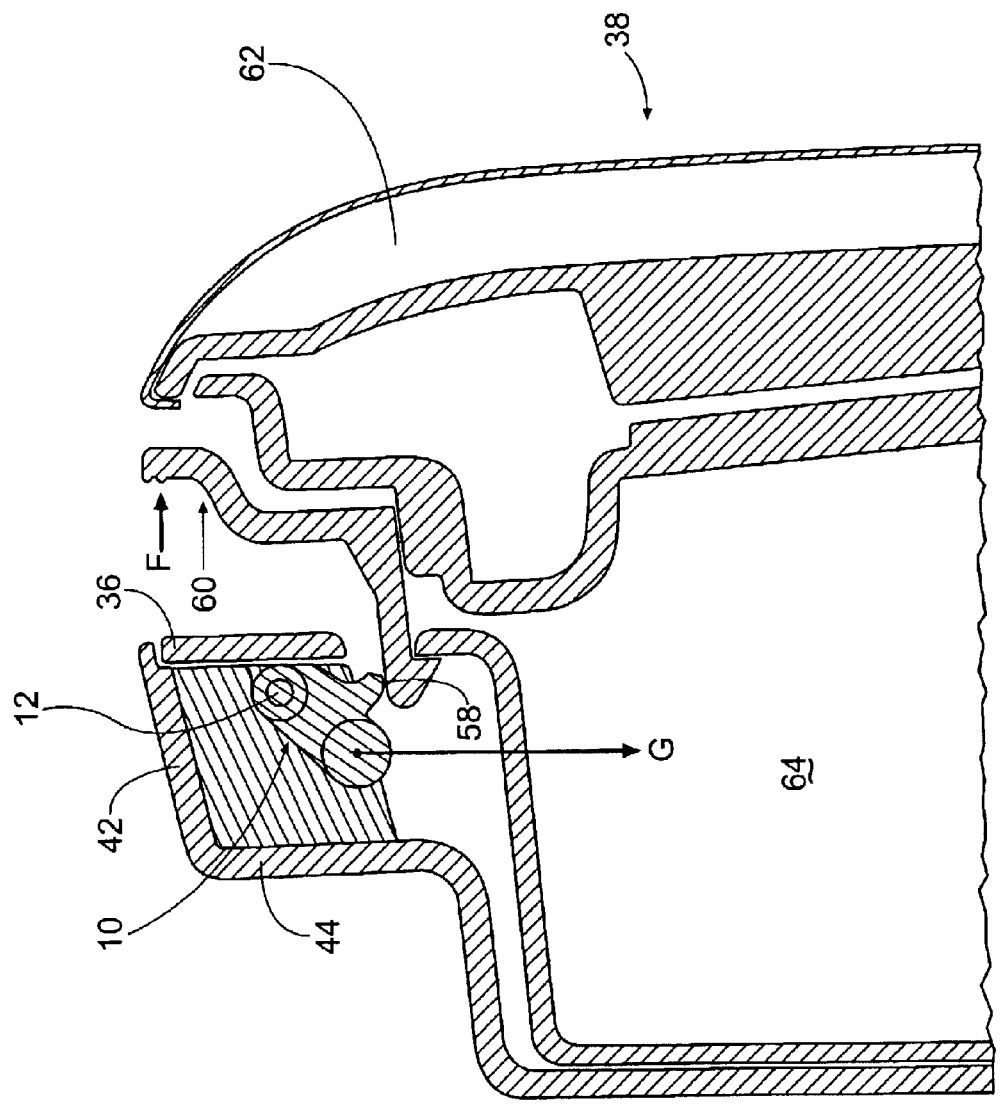
FIG. 3B is a partial cross-sectional view of the armrest assembly taken along line 3—3 when the armrest assembly is in a generally vertical position.
Figure 5:
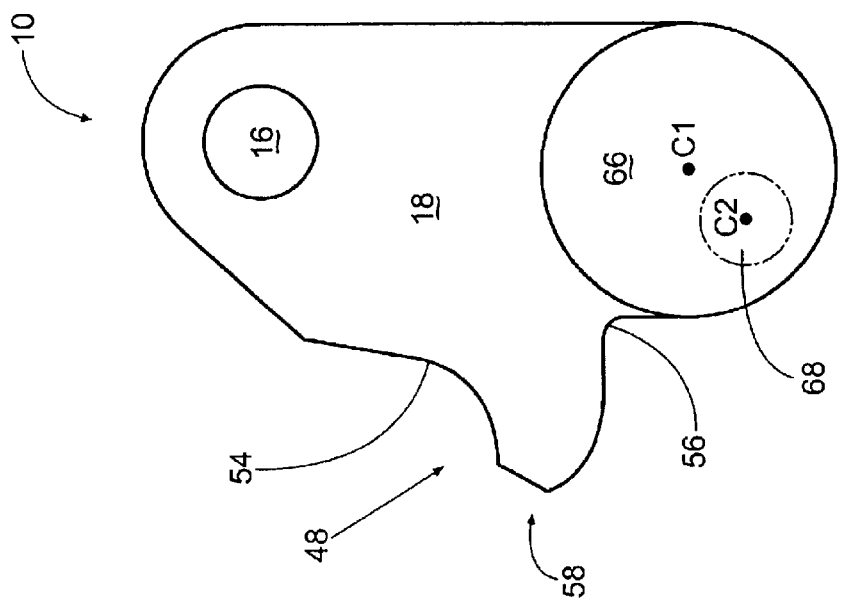
FIG. 5 is a side view of the latch lockout of FIG. 1.
Figure 4:
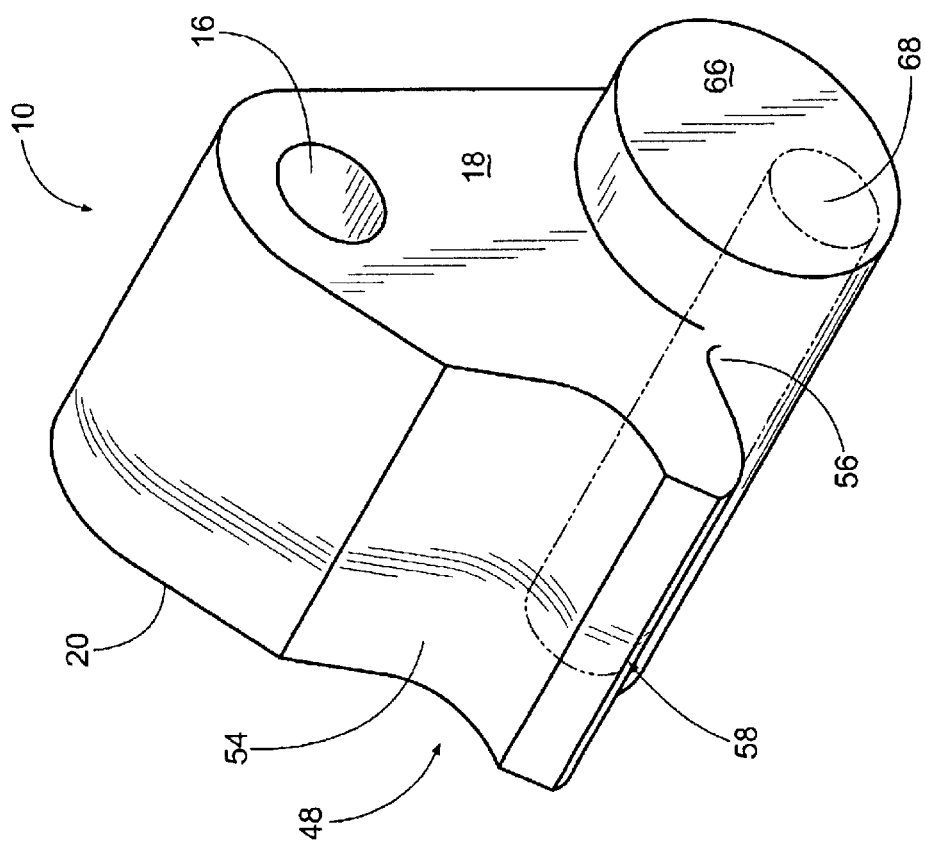
FIG. 4 is a perspective view of the latch lockout of FIG. 1.

Referring also to FIGS. 4 and 5, the latch lockout 10 may be further be defined by a "mitten shape" (FIG. 5) including means, such as a locking finger 48, for restricting travel and preventing rattle, increasing locking strength of the latch lockout 10, and physically engaging a latch member 60 (FIGS. 2A-3B). The locking finger 48 is further defined by a first cutout or notch 54 and a second cutout or notch 56 that each extends to and terminates at a latch member engagement surface 58. The first and second notches 54, 56 allow the latch lockout 10 to be located very close to the latch 60, which minimizes the amount of swing and rattles caused by the latch lockout 10. In addition, the shape of the locking finger 48 of the latch lockout 10 is designed to draw the latch lockout 10 into the latch 60, thereby causing the latch lockout 10 to activate earlier (at a lower angle, $\theta$) than conventional structures. Thus, the locking finger 48 permits early engagement of a latch member 60 attached to a top cover 62 of the armrest 38.

As shown in FIGS. 2A and 3A, the armrest 38 may be initially positioned in a generally horizontal, in-use position. When the armrest 38 is in the generally horizontal position, the latch lockout 10 freely rests at a distance, D (FIG. 3A), away from the latch member 60. According to the design of the inventive latch lockout 10, the distance, D, is minimized because the engagement surface 58 is designed to extend near the latch member 60. Therefore, by minimizing the distance, D, when the armrest 38 is pivoted, the latch lockout 10 may engage the latch member 60 when the armrest 38 is pivoted at a relatively low pivot angle, $\theta$ (FIG. 2B). For example, latch lockout 10 may engage the latch member 60 when the angle, $\theta$, is approximately equal to 30°.

Accordingly, as illustrated in FIGS. 2B and 3B, when the armrest 38 is pivoted to the generally vertical, stowed position, the latch lockout 10 physically engages the latch member 60 by pivoting about the pivot member 12. As seen more clearly in FIG. 3B, the gravitational force in the direction of the arrow, G, causes the latch lockout 10 to cam into position, and thereby abuts the engagement surface 58 against the latch member 60. Essentially, the latch lockout 10 acts as a gravity-actuated pendulum and an undesirable force applied to the latch member 60 in the direction of the arrow, F, is translated directly to the latch lockout 10 in order to prevent the latch member 60 from unlatching the top cover 62. Accordingly, the top cover 62 is prevented from pivotally deploying and thereby retains items that are stored in a storage bin 64 of the armrest 38.

Because the latch lockout 10 is actuated by gravity in the direction of the arrow, G, the center of gravity of the latch lockout 10 causes the latch lockout 10 to cam into a locked position against the latch member 60, and accordingly, the angle, $\theta$, at which the latch lockout 10 cams into a locked position is determined by the center of gravity of the latch lockout 10. As illustrated in FIG. 1, a lower portion 66, which comprises approximately one-third to one-half of the mass of the entire latch lockout 10, is illustrated as a generally cylindrical member that integrally extends from the first side 18 and second side 20. Accordingly, if the density of the mass of the lower portion 66 were to be changed, then the angle, $\theta$, at which the latch lockout 10 cams into a locked position can be reduced due to a shift in the center of gravity of the latch lockout 10. Therefore, changing the density of the mass of the lower portion 66 may be accomplished by either molding the lower portion 66 with a denser material, or, by selectively providing extra mass in the lower portion 66 of the latch lockout 10.

Referring now to FIGS. 4 and 5, the lower portion 66 of the latch lockout 10 may include extra mass, such as a weighted slug 68. Essentially, the weighted slug 68 may assist the latch lockout 10 in camming to a locked position. In one possible implementation, the weighted slug 68 may be selectively offset in the lower portion 66 that is closer to the second notch 56, and thereby shifts the center of gravity, C1, of the lower portion 66, to a location approximately near the center of gravity, C2, of the weighted slug 68. For example, if the weighted slug 68 is located near the second notch 56 as explained above, the latch lockout 10 may engage at a angle, θ, such as approximately 15°.

The embodiments of the latch lockout 10 described above reduces production time, cost, and parts, while also providing an early engagement of the latch member 60 as the armrest 38 is orientated from the generally horizontal, in-use position (FIG. 2A) to the generally vertical, stowed position (FIG. 2B). In summary, the latch lockout 10 prevents the top cover 62 from pivotally deploying and ejecting items in the storage bin 64 when an undesirable force is applied in the direction of the arrow, F, to the latch member 60 as a result of the armrest 38 being positioned in the generally vertical, stowed position.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A vehicle trim component, comprising:
    a latch lockout assembly including a latch lockout, a pivot member, and a housing, the latch lockout and pivot member being pivotally mounted to the housing to permit physical engagement of the latch lockout and a latch member due to a gravitational force when the vehicle trim component is pivoted to a predetermined pivot angle, wherein the latch lockout further includes a locking finger defined by a first notch and a second notch extending to and terminating at a latch member engagement surface.

2. The vehicle trim component according to claim 1, wherein the vehicle trim component comprises a pivoting armrest, wherein the latch lockout assembly is attached to a top cover of the armrest, wherein the housing is affixed to an interior structure of the armrest.

3. The vehicle trim component according to claim 2, wherein the latch lockout freely rests at a distance away from the engagement surface when the armrest is positioned in a generally horizontal position, and wherein the engagement surface of the latch lockout physically engages the latch member at the predetermined pivot angle when the armrest is pivoted to a generally vertical position, and wherein a force applied to the latch member is directly translated to the latch lockout and prevents the latch member from unlatching.

4. The vehicle trim component according to claim 1, wherein the predetermined pivot angle is determined by a center of gravity of the latch lockout.

5. The vehicle trim component according to claim 1, wherein the predetermined pivot angle is approximately 30°.

6. The vehicle trim component according to claim 1, wherein the latch lockout further comprises a lower portion that is defined by a generally cylindrical shape and extends from a first side of the latch lockout to a second side of the latch lockout.

7. The vehicle trim component according to claim 6, wherein the lower portion includes a weighted slug that assists the latch lockout in physically engaging the latch member by shifting the center of gravity of the latch lockout to a location approximately near a center of gravity of the weighted slug.

8. The vehicle trim component according to claim 1, wherein the predetermined pivot angle is approximately equal to 15°.

9. The vehicle trim component according to claim 1, wherein the pivot member is made of a metal coated with thermoplastic resin.

10. A pivoting armrest, comprising:
    a pivot member;
    a latch lockout including a locking finger defined by a first notch and a second notch that each extends to and terminates at a latch member engagement surface;
    a latch member affixed to a top cover of the armrest; and
    a housing affixed to an interior structure the armrest,
    wherein the latch lockout and pivot member are pivotally mounted to the housing to permit physical engagement of the latch lockout and the latch member engagement surface, and
    wherein the latch lockout freely rests at a distance away from the latch member when the armrest is positioned in a generally horizontal position, and
    wherein the latch member engagement surface physically engages the latch member when the armrest is pivoted at a predetermined pivot angle, and
    wherein a force applied to the latch member is directly translated to the latch lockout, thereby preventing the latch member from unlatching and deploying the top cover of the armrest.

11. The pivoting armrest according to claim 10, wherein the predetermined pivot angle is approximately 30°.

12. The pivoting armrest according to claim 10, wherein the latch lockout further comprises a lower portion that is defined by a generally cylindrical shape and integrally extends from a first side of the latch lockout to a second side of the latch lockout.

13. The pivoting armrest according to claim 12, wherein the lower portion includes a weighted slug that assists the latch lockout to physically engage the latch member engagement surface, wherein the weighted slug is offset in the lower portion and positioned closer to the latch member engagement surface to shift the center of gravity of the latch lockout to a location nearer to a center of gravity of the weighted slug.

14. The pivoting armrest according to claim 13, wherein the predetermined pivot angle is approximately 15°.

15. A pivoting armrest, comprising:
    a pivot member;
    a latch member affixed to a top cover of the armrest;
    a latch lockout comprising a locking finger including a first notch and a second notch that extend to a latch member engagement surface; and
    a housing affixed to an interior structure of the armrest, the latch lockout and pivot member being pivotally mounted to the housing,
    wherein the latch lockout freely rests at a distance away from the latch member engagement surface when the armrest is positioned in a generally horizontal position, and wherein the latch member physically engages the latch member engagement surface when the armrest is pivoted to a predetermined pivot angle, and wherein a force applied to the latch member is directly translated to the latch lockout, thereby preventing the latch member from unlatching when the armrest is pivoted to the predetermined pivot angle.

16. An armrest assembly, comprising:

a pivotable armrest body encompassing a storage bin area;

a cover pivotably connected to the armrest body, the cover including a latch member; and a weighted camming pendulum including a locking finger notch adaptable to positively engage the latch member in order to prevent the cover of the pivotable armrest body to become unlatched upon positioning the armrest body in a generally vertical, upright position.

17. The armrest assembly according to claim 16, wherein the weighted camming pendulum has a center of gravity that determines at which angle the weighted camming pendulum cams into a locked position to prevent the cover of the pivotable armrest body to become unlatched.

* * * * *